US009664905B2

(12) United States Patent
Bohn et al.

(10) Patent No.: US 9,664,905 B2
(45) Date of Patent: May 30, 2017

(54) DISPLAY EFFICIENCY OPTIMIZATION BY COLOR FILTERING

(71) Applicant: Microsoft Technology Licensing, LLC, Redmond, WA (US)

(72) Inventors: David D. Bohn, Fort Collins, CO (US); Ned Nestorovic, Seattle, WA (US); Rod G. Fleck, Bellevue, WA (US); Cynthia Bell, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 703 days.

(21) Appl. No.: 13/931,241

(22) Filed: Jun. 28, 2013

(65) Prior Publication Data

US 2015/0002528 A1    Jan. 1, 2015

(51) Int. Cl.
*G02B 27/00* (2006.01)
*G02B 27/01* (2006.01)
(Continued)

(52) U.S. Cl.
CPC ........... *G02B 27/0172* (2013.01); *G02B 5/18* (2013.01); *G02B 6/0076* (2013.01); *G02B 2027/0112* (2013.01); *G02B 2027/0178* (2013.01)

(58) Field of Classification Search
CPC .............. G02B 6/0038; G02B 27/0081; G02B 27/0172; G02B 6/0076; G02B 27/1086;
(Continued)

(56) References Cited

U.S. PATENT DOCUMENTS 6,910,777 B2   6/2005   Ito
7,746,423 B2   6/2010   Im et al.
(Continued)

FOREIGN PATENT DOCUMENTS

DE    102007021036 A1   11/2008
EP        2381290 A1    10/2011

OTHER PUBLICATIONS

"International Preliminary Report on Patentability Issued in PCT Application No. PCT/US2014/044393", Mailed Date: Jun. 19, 2015, 7 Pages.
(Continued)

*Primary Examiner* — Kenneth Bukowski
(74) *Attorney, Agent, or Firm* — Vierra Magen Marcus LLP

(57) ABSTRACT

Technology is disclosed for optimizing a near-eye display using a waveguide. A first waveband for a first color narrower than the full spectral bandwidth for the first color and a second waveband for a second color adjacent to the first color in the visible spectrum are generated in image light of an image generation unit like a microdisplay. The first waveband and the second waveband are coupled into a same layer of a diffractive waveguide. An input grating of the same layer of the waveguide has a grating wavelength band approximately matching a waveband extensive with the first waveband and the second waveband. A converted green light emitting diode (LED) may be used for obtaining a first waveband centered around 515 nm in some examples. One of more of the wavebands may be obtained using filters, for example filters using dichroic mirrors, quantum dots or a combination of these.

20 Claims, 9 Drawing Sheets

(51) Int. Cl.
*G02B 5/18* (2006.01)
*F21V 8/00* (2006.01)

(58) Field of Classification Search
CPC ...... G02B 27/141; G02B 5/18; G02B 6/0008; G02B 27/0961; G02B 27/0994; G02B 19/0014; G02B 19/0061; H04N 9/3152; G03B 21/2013; G03B 21/208
See application file for complete search history.

(56) References Cited

U.S. PATENT DOCUMENTS

| | | | |
|---|---|---|---|
| 7,982,812 B2 | 7/2011 | Rho et al. | |
| 2006/0198027 A1 | 9/2006 | Li et al. | |
| 2009/0213315 A1 | 8/2009 | Wang | |
| 2010/0046070 A1 | 2/2010 | Mukawa | |
| 2010/0134534 A1* | 6/2010 | Seesselberg | G02B 6/0038 345/690 |
| 2011/0141769 A1 | 6/2011 | Lee et al. | |
| 2011/0216396 A1* | 9/2011 | Ouderkirk | G02B 27/141 359/352 |
| 2011/0221659 A1 | 9/2011 | King et al. | |
| 2011/0317397 A1 | 12/2011 | Trottier et al. | |
| 2012/0148946 A1 | 6/2012 | Tu et al. | |
| 2012/0235885 A1 | 9/2012 | Miller et al. | |
| 2012/0248479 A1 | 10/2012 | Anc | |
| 2013/0033756 A1 | 2/2013 | Spitzer et al. | |
| 2014/0185142 A1* | 7/2014 | Gupta | G02B 27/1086 359/630 |

OTHER PUBLICATIONS

Heindel, et al., "Quantum Key Distribution Using Quantum Dot Single-Photon Emitting Diodes in the Red and Near Infrared Spectral Range", In Proceedings of The Open Access Journal of Physics, vol. 14, Aug. 2010, 13 pages.

Wallace, John, "Green Phosphor-Converted Led with LPDF Aims at Ultrahigh Efficiency", Published on: Aug. 12, 2011, 2 pages, Available at: http://www.laserfocusworld.com/articles/2011/12/green-phosphor-converted-led-with-lpdf.html.

LEDs Magazine, "Osram Opto Semiconductors offers an extensive LED portfolio for general lighting", Jan. 2005, 3 pages.

"International Search Report & Written Opinion for PCT Patent Application No. PCT/US2014/044393", Mailed Date: Oct. 6, 2014, 9 pages.

* cited by examiner

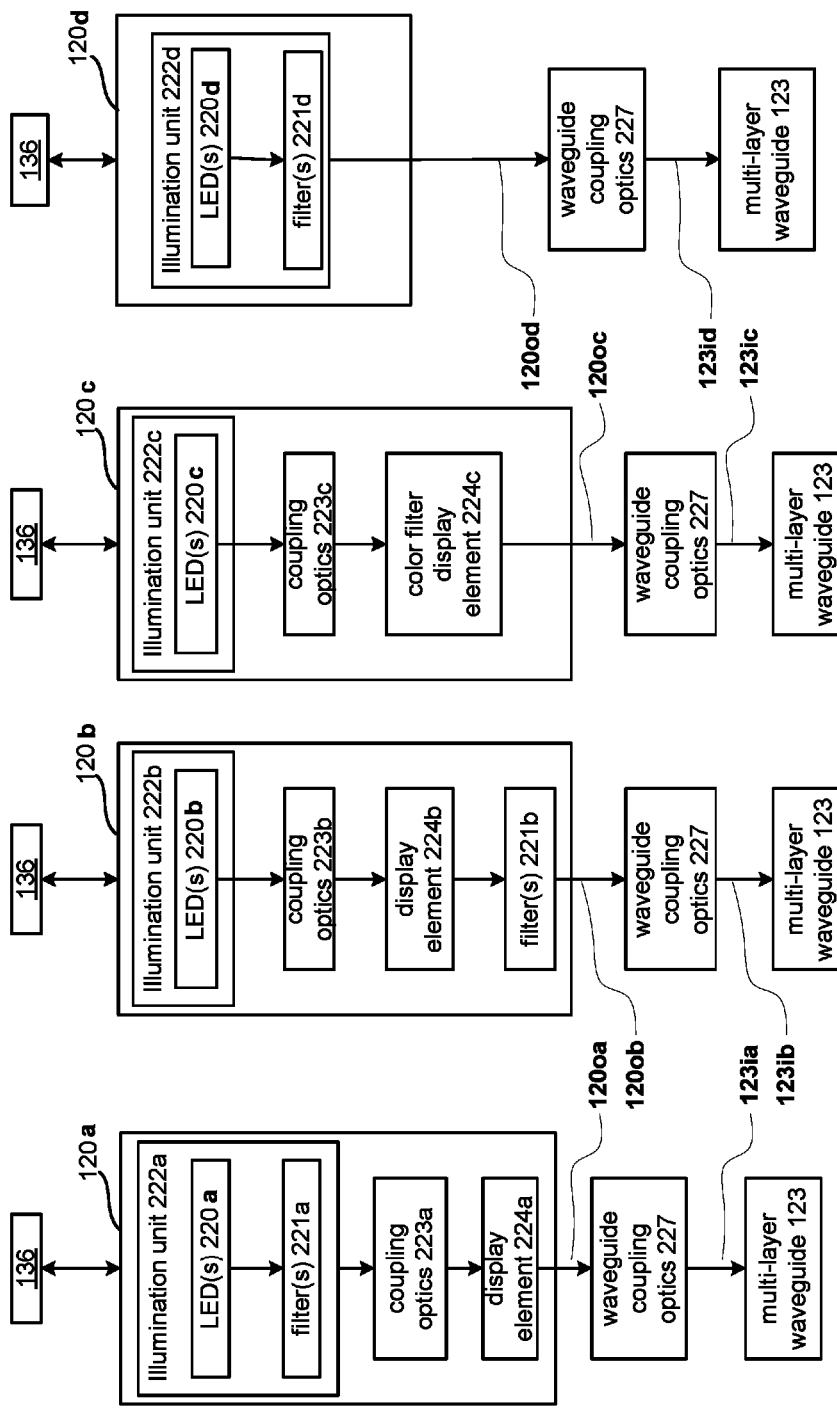

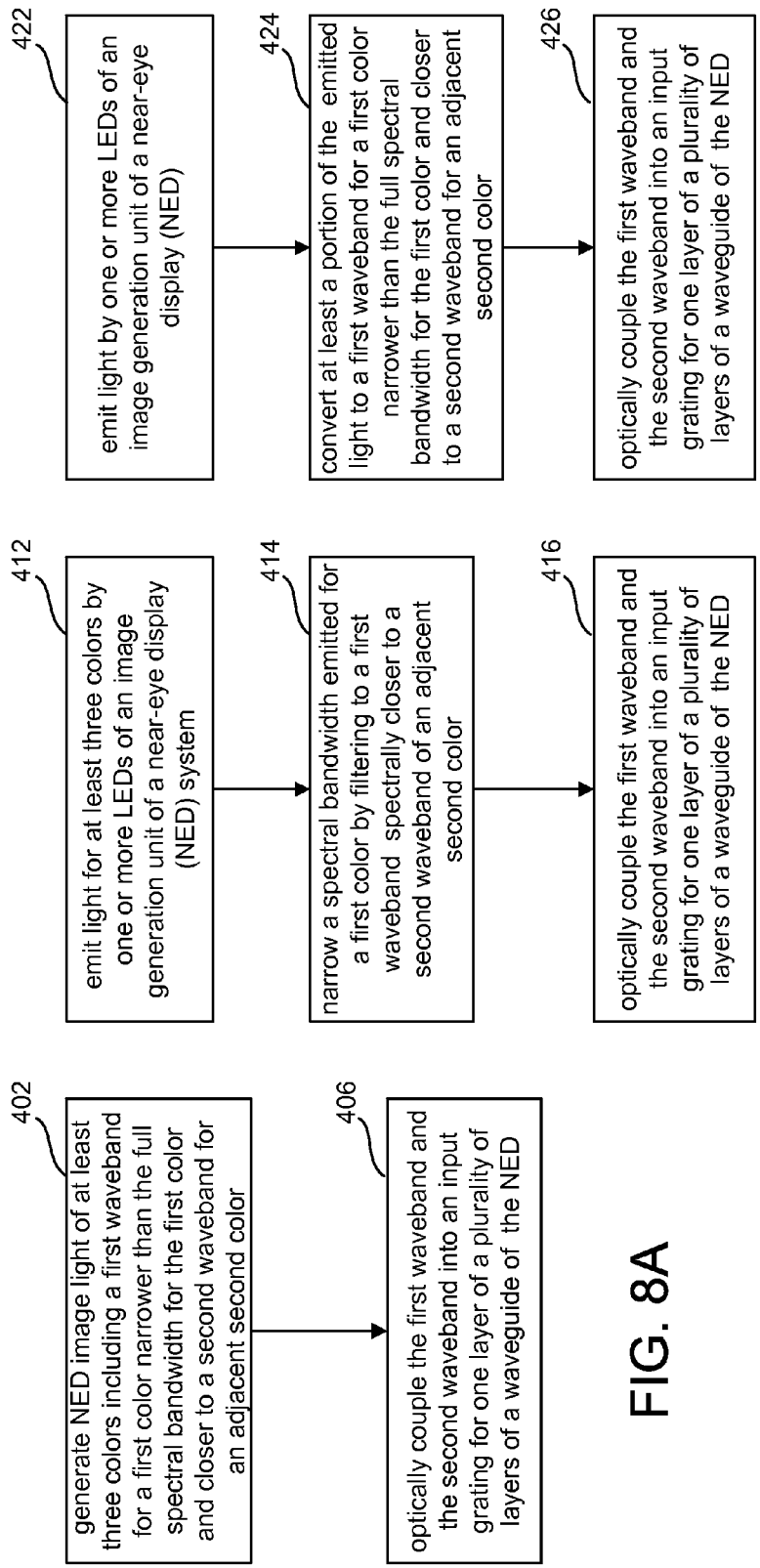

DISPLAY EFFICIENCY OPTIMIZATION BY COLOR FILTERING

BACKGROUND

Display devices like waveguide based solutions and projection solutions can be implemented using bandwidth selective optical elements. A near-eye display (NED) device, such as a head mounted display (HMD) device, may be worn by a user for experiences such as an augmented reality (AR) experience and a virtual reality (VR) experience. A NED device includes an image generation unit, often called a light engine, for generating an image which is optically coupled into the near-eye display (NED) which may be implemented using waveguide technology which NED directs the image into the eye of the user so the user sees a projected image.

In practice, a NED waveguide module may include a stack of multiple waveguides, with each waveguide assigned to a wavelength range or wavelength band also referred to as a waveband. Multiple waveguides are useful as color spectral bandwidth in the visible spectrum can be fairly wide. The multiple waveguides support more color hues, creating more realistic imagery when viewed by a human eye. However, for diffractive waveguides, diffraction gratings which couple light in and out of the waveguide do not accommodate wide bandwidths well. More layers of waveguides can be added in a stack to each deal with different portions of color bandwidths, but that also adds more cost and weight and size to the NED, a device a human typically wears on his or her head.

SUMMARY

The technology provides one or more embodiments for optimizing a display system including one or more color waveband selective optical elements. For example, the technology provides one or more embodiments for optimizing a near-eye display using a waveguide by reducing color bandwidth of at least one color and coupling the narrowed color bandwidth with a bandwidth of an adjacent color in the visible spectrum into a same layer of a diffractive waveguide.

The technology provides one or more embodiments of a display system. An embodiment of the display system comprises a display, one or more color waveband selective optical elements optically coupled to the display, and an image generation unit which generates a first waveband for a first color which is narrower than a full spectral bandwidth for the first color and a second waveband for a second color. The technology also provides an embodiment of a near-eye display system. An embodiment of the near-eye display system comprises a near-eye support structure supporting a near-eye display (NED) including a waveguide having a plurality of layers. An image generation unit is also supported by the near-eye support structure, and includes one or more light emitting diodes (LEDs) for emitting light. The image generation unit generates image light of at least three colors from the light emitted by the one or more LEDs for the NED. The image light includes a first waveband for a first color narrower than a full spectral bandwidth for the first color and a second waveband for a second color adjacent to the first color in a visible spectrum. The waveguide includes a first input grating of one layer of the waveguide. The first input grating is optically coupled for receiving image light from the image generation unit and has a grating wavelength band approximately matching a waveband extensive with the first waveband and the second waveband for coupling light into the one layer.

The technology provides another embodiment of a near-eye display system. An embodiment of another near-eye display system comprising a near-eye support structure supporting a near-eye display (NED) including a waveguide having a plurality of layers and an input grating for each of the plurality of layers. At least one of the layers has an input grating having a wavelength band extensive with a first waveband for a first color and a second waveband for a second color which second color is adjacent the first color in a visible spectrum. The first waveband for the first color is narrower than a full spectral bandwidth for the first color. The waveguide is optically coupled to an image generation unit supported by the near-eye support structure for receiving image light.

The technology provides an embodiment of a method for optimizing waveguide performance in a near-eye display (NED) system. An embodiment of the method comprises generating image light of at least three colors for a waveguide of the near-eye display (NED) by an image generation unit. The image generation unit may be mounted on a near-eye support structure of the near-eye display system. The image light includes a first waveband for a first color narrower than the full spectral bandwidth for the first color and a second waveband for a second color of the three colors adjacent to the first color in the visible spectrum. The first waveband and the second waveband are optically coupled from the image generation unit into an input grating of one layer of the waveguide. The input grating has a grating wavelength band which approximately matches a waveband extensive with the first waveband and the second waveband for coupling light into the one layer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A, 4B, 4C and 4D are block diagrams for illustrating some embodiments of different arrangements in terms of light flow path of LEDs, filters, and display devices in an image generation unit which may be used in implementing the technology.

FIG. 8A is a flowchart of an embodiment of a method for optimizing waveguide performance based on color filtering in a near-eye display (NED) system.

FIG. 8B is a flowchart of another embodiment of a method for optimizing waveguide performance based on color filtering in a near-eye display (NED) system.

FIG. 8C is a flowchart of yet another embodiment of a method for optimizing waveguide performance based on color filtering using one or more quantum dots for converting light to a desired waveband in a near-eye display (NED) system.

DETAILED DESCRIPTION

Figure 1:
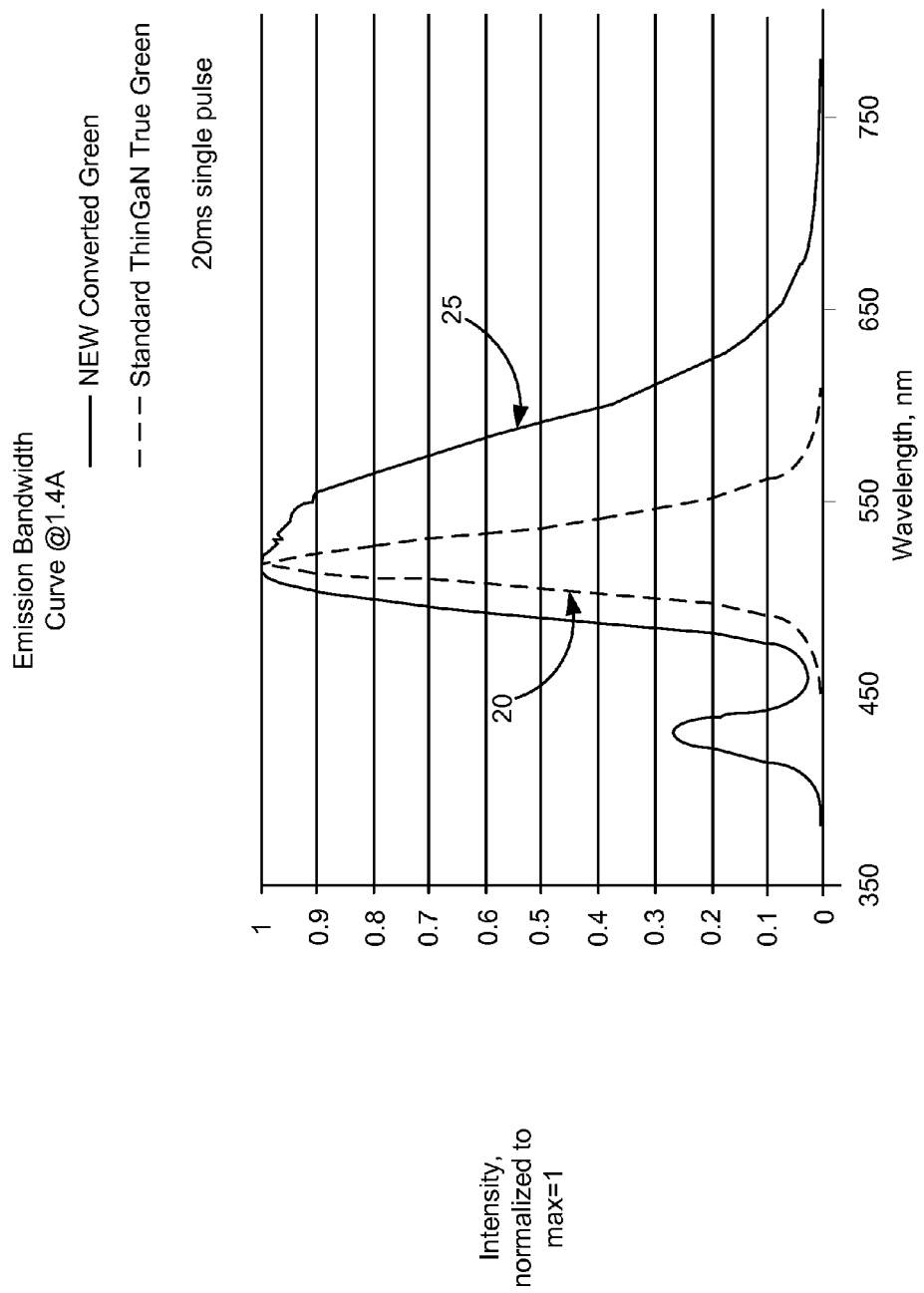
FIG. 1 illustrates examples of color bandwidths for the color green for a standard green LED and a converted green LED.

Embodiments of the technology may be used for optimizing display systems including one or more color waveband selective optical elements. Besides waveguide based displays, the technology for narrowing a color waveband may be used for displays like projection systems which use bandwidth selective RGB reflective surfaces as color waveband selective optical elements. Such displays are used in large scale 3D display systems.

Embodiments of the technology are described for optimizing efficient coupling of visible light into a multi-layer waveguide while also decreasing the number of waveguide layers by combining a plurality of colors into one layer of the plurality of layers of the multi-layer waveguide. An example of a waveguide which may be used is a diffractive waveguide having one or more diffraction gratings for coupling light into each waveguide layer. An example of a diffractive grating is a surface relief grating. Each layer has at least one input grating matched to a band of wavelengths, also referred to as hereafter as a waveband.

For an input grating like a diffractive grating, coupling efficiency of the light into the waveguide layer (and out of the waveguide layer by an output grating in some embodiments) increases as the waveband to be coupled decreases. Additionally, a waveguide flooded with a wide waveband or a wide range of wavelengths covering different colors results in a lower contrast image. For example, a light emitting diode (LED) may emit a waveband of about 150 nanometers (nm) about a center wavelength. A diffractive input grating like a surface relief grating may have an efficient coupling range about the same center wavelength of about 50 nm to 100 nm. Depending on the waveband accommodated by the grating, a third to two-thirds of the LED emitted or transmitted light is not used, but the narrower waveband for coupling maintains good diffractive performance, and thus coupling efficiency and image contrast. Additionally, the beam including the narrowed first waveband and the second waveband can be confined to work with switchable Bragg gratings as well.

Before describing the embodiments, a short discussion about colors and their spectral bandwidths is provided. The colors of the visible spectrum are often remembered by the acronym ROYGBIV indicating an order of colors from longer wavelength to shorter wavelength of red, orange, yellow, green, blue, indigo and violet. Reference to a "spectral bandwidth" of a color is referring to a full wavelength band associated with that color in the visible spectrum. For example, in the table below, red is identified with a spectral bandwidth between 620 nm-750 nm. There might be small differences of where one color begins and one color ends in different reference sources. The visible spectrum is continuous, however, certain spectral bandwidths have been associated with different colors such as indicated in the following table as indicated by Thomas J. Bruno, Paris D. N Svoronos, *CRC Handbook of Fundamental Spectroscopic Correlation Charts* p. 2 CRC Press (2005).

Visible Region:

| Color | Spectral Bandwidth |
|---|---|
| Red | 620 nm-750 nm |
| Orange | 590 nm-620 nm |
| Yellow | 570 nm-590 nm |
| Green | 495 nm-570 nm |
| Blue | 450 nm-495 nm |
| Indigo and Violet | 380 nm-450 nm |

Color displays typically generate red, green and blue light as the human retina has receptors sensitive to red, green and blue, the combinations of which can form many colors. Traditional light emitting diodes (LEDs), especially green phosphorescent LEDs, emit colors, for example blue and green, at wavebands far enough apart to not allow efficient coupling of both colors simultaneously by the same grating.

In some embodiments, a converted green LED is used for generating a green color waveband as a converted green LED emits more light in the green portion of the visible spectrum closer to a blue portion of the spectrum. An example of a commercially available green converted LED are those made by OSRAM. FIG. 1 illustrates examples of color bandwidths for the color green for a standard green LED 20 and a converted green LED 25. This is an emission bandwidth curve at 1.4 Amps of input current producing a 20 ms single pulse and with intensity normalized for a maximum of one (1). The wavelengths are presented in units of nanometers. For the standard Thin Gallium Nitride (Thin-GAN) True Green LED, its emission bandwidth 20 shown in the dashed line is narrower than that for the converted green LED emission bandwidth 25 shown in solid line. Both LEDs peak or are centered about 515 nm, but the converted green LED has a wider green color bandwidth extending below 515 nm.

Using green light closer to blue, achieves a lower wavelength band or lower waveband of green light which may be coupled into a same waveguide layer with blue light, and thus higher throughput efficiency and improved uniformity is provided by a grating into the waveguide. Human green receptors on the fovea are particularly receptive to green about 555 nm which provides good color saturation. The color gamut in terms of hue and saturation decreases a bit, but, there is still good coupling with the human eye. Additionally, the number of waveguide layers for colors can be reduced, thus decreasing system cost and real estate. For example, a green waveband of about 50 nm centered around 515 nm captures the lower portion of the green spectral bandwidth, and a blue waveband of about 50 nm centered around 450 nm captures blue as well as some indigo shades of blue. These two wavebands can be coupled into a same layer of a waveguide. A red wavelength band centered at about 617 nm and about 50 nm wide can be coupled into another layer of the waveguide. Thus, in some examples, a waveguide of just two layers may be used.

As shown the emission bandwidth of the converted green LED extends at least another 50 nm or so for longer wavelengths as well. In some embodiments, additional layers of a waveguide may couple different portions of the same color spectrum, for example a lower portion of green centered about 515 nm and an upper portion of green centered about 550 nm. In other examples, additional redundant color layers may be used for capturing light which did not couple, despite a matching grating, in a first pass layer.

Figure 2:
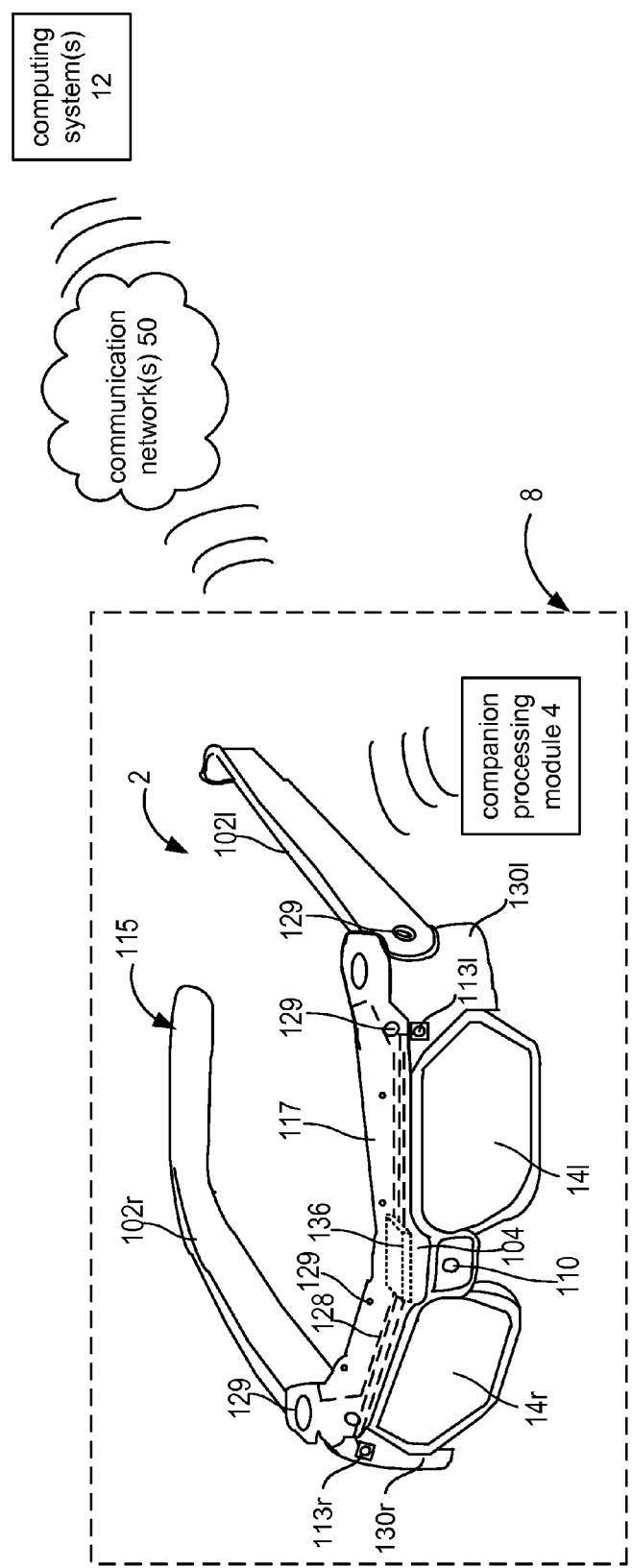
FIG. 2 is a block diagram depicting example components of an embodiment of a near-eye display (NED) device system.

FIG. 2 is a block diagram depicting example components of an embodiment of a near-eye display (NED) system. In the illustrated embodiment, the system 8 includes a near-eye display (NED) device as a head mounted display (HMD) device 2 which is communicatively coupled to another computer system identified as a companion processing module 4. Wireless communication is illustrated in this example, but communication via a wire between module 4 and the display device 2 may also be implemented. In other embodiments, the functionality of the companion processing module 4 may be integrated in software and hardware components of the display device 2.

In this embodiment, NED device 2 is in the shape of eyeglasses in a frame 115, with a respective display optical system 14 (14*l* and 14*r*) positioned at the front of the NED device to be seen through by each eye when the NED is worn by a user. In this embodiment, each display optical system 14 uses a projection display in which image data is projected into a user's eye to generate a display of the image data so that the image data appears to the user at a location in a three dimensional field of view in front of the user. Each display optical system 14 is also referred to as a display, and the two display optical systems 14 together may also be referred to as a display.

In this embodiment, frame 115 provides a convenient eyeglass frame as a near-eye support structure for holding elements of the NED device 2 in place as well as a conduit for electrical connections. Some other examples of a near-eye support structure are a visor frame or a goggles support. The frame 115 includes a nose bridge 104, a front top cover section 117, a respective image generation unit housing 130 for each of a left side (130*l*) and a right side (130*r*) of the device as well as left and right temples or side arms 102*l* and 102*r* which are designed to rest on each of a user's ears. In this embodiment, nose bridge 104 includes a microphone 110 for recording sounds and transmitting audio data to control circuitry 136. On the exterior of the side housing units 130*l* and 130*r* are respective outward facing cameras 113*l* and 113*r* which capture image data of the real environment in front of the user for mapping what is in a field of view of a near-eye display (NED).

In this embodiment, dashed lines 128 are illustrative examples of some electrical connection paths which connect to control circuitry 136, also illustrated in dashed lines. One dashed electrical connection line is labeled 128 to avoid overcrowding the drawing. The electrical connections and control circuitry 136 are in dashed lines to indicate they are under the front top cover section 117 in this example. There may also be other electrical connections (not shown) including extensions of a power bus in the side arms for other components, some examples of which are sensor units including additional cameras, audio output devices like earphones or units, and perhaps an additional processor and memory. Some examples of connectors 129 as screws are illustrated which may be used for connecting the various parts of the frame together.

The companion processing module 4 may take various embodiments. In some embodiments, companion processing module 4 is in a portable form which may be worn on the user's body, e.g. a wrist, or be a separate portable computer system like a mobile device (e.g. smartphone, tablet, laptop). The companion processing module 4 may communicate using a wire or wirelessly over one or more communication networks 50 to one or more network accessible computer systems 12, whether located nearby or at a remote location. In other embodiments, the functionality of the companion processing module 4 may be integrated in software and hardware components of the display device 2. One or more network accessible computer system(s) 12 may be leveraged for processing power and remote data access. The complexity and number of components may vary considerably for different embodiments of the computer system 12 and the companion processing module 4.

Image data is identified for display based on an application, e.g. a game or messaging application, executing on one or more processors of the control circuitry 136, or the companion processing module 4 or a remote computer system 12 providing image data to the near-eye display 14, or a combination of these.

Figure 3A:
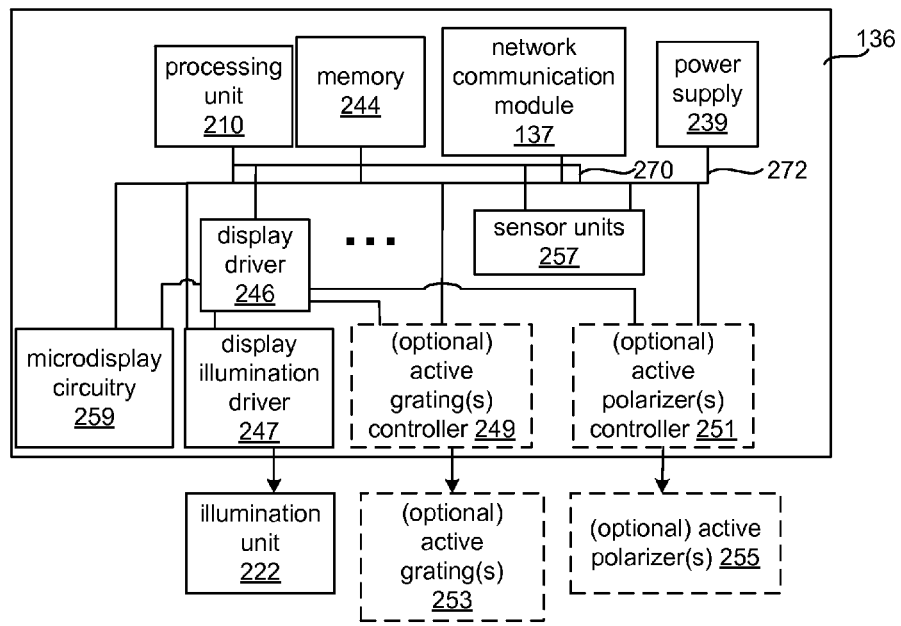
FIG. 3A is a block diagram of example hardware components including a computer system within control circuitry of a NED device.

FIG. 3A is a block diagram of example hardware components including a computer system within control circuitry of a NED device. Control circuitry 136 provides various electronics that support the other components of head mounted, near-eye display device 2. In this example, the control circuitry 136 for the display device 2 comprises a processing unit 210, a memory 244 accessible to the processing unit 210 for storing processor readable instructions and data, a communication module 137 communicatively coupled to the processing unit 210 which can act as a network interface for connecting the NED device to another computer system such as the companion processing module 4, a computer system of another NED device or one which is remotely accessible over the Internet. A power supply 239 provides power for the components of the control circuitry 136 and the other components of the display device 2 like the capture devices 113, the microphone 110, other sensor units, and for power drawing components for displaying image data on the display 14 such as light sources and electronic circuitry associated with an image generation unit like a microdisplay in an image generation unit.

The processing unit 210 may comprise one or more processors including a central processing unit (CPU) and a graphics processing unit (GPU), particularly in embodiments without a separate companion processing module 4 which contains at least one graphics processing unit (GPU). Memory 244 is representative of the various types of memory which may be used by the system such as random access memory (RAM) for application use during execution, buffers for sensor data including captured image data and display data, read only memory (ROM) or Flash for instructions and system data, and other types of nonvolatile memory for storing other items, some examples of which are applications and user profile data. In this example, an electrical connection of a data bus 270 connects the sensor units 257, the display driver 246, processing unit 210, memory 244, and the communication module 137. The data bus 270 also derives power from the power supply 239 through a power bus 272 to which all the illustrated elements of the control circuitry are connected for drawing power.

Figure 5B:
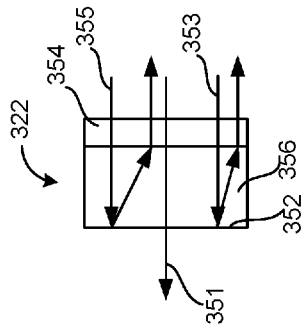
FIG. 5B illustrates an example of a color band filter which may be used to implement one or more filters in embodiments of the technology.

The control circuitry further comprises a display driver 246 for selecting digital control data, e.g. control bits, to represent image data which digital control data may be decoded by microdisplay circuitry 259 and different active component drivers of an image generation unit (e.g 120 in FIG. 5B). A microdisplay may be an active transmissive, emissive or reflective device. For example, a microdisplay may be a liquid crystal on silicon (LCoS) device requiring power or a micromechanical machine (MEMs) based device requiring power to move individual mirrors. An example of an active component driver is a display illumination driver 247 which converts digital control data to analog signals for driving an illumination unit 222 which includes one or more light sources like one or more light emitting diodes (LEDs). In some embodiments, a display unit may include one or more active gratings 253, such as for a waveguide, for coupling the image light at the exit pupil from the image generation unit. An active grating(s) controller 249 converts digital control data into signals for changing the properties of one or more gratings. Similarly, one or more polarizers of an image generation unit may be active polarizers 255 which an optional active polarizer(s) controller 251 may drive. The control circuitry 136 may include other control units not illustrated here but related to other functions of a NED device such as providing audio output, identifying head orientation and location information.

In other embodiments, some of the processing and memory resources identified in FIG. 3A can be shared between the control circuitry 136 and the companion processing module 4.

Figure 3B:
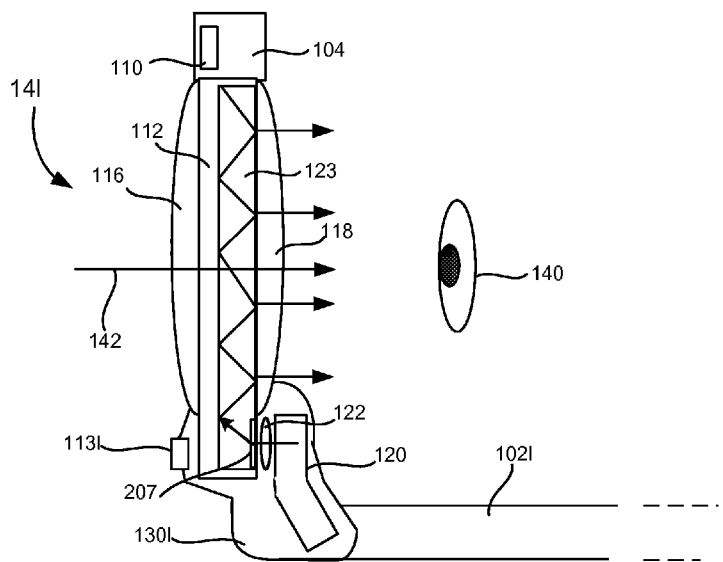
FIG. 3B is a top view of an embodiment of a near-eye display being coupled with an image generation unit.

FIG. 3B is a top view of an embodiment of a near-eye display 141 being coupled with an image generation unit 120. In order to show the components of the display optical system 14, in this case 141 for the left eye, a portion of the top frame section 117 covering the display 141 and the image generation unit 120 is not depicted. Arrow 142 represents an optical axis of the display optical system 141. Eye space 140 approximates a location of a user's eye when the device 2 is worn.

In this embodiment, the displays 141 and 14*r* are optical see-through displays. In other embodiments, they can be video-see displays. Each display includes a display unit 112 illustrated between two optional see-through lenses 116 and 118 as protective covering and including a multi-layer waveguide 123. In this overview drawing to prevent overcrowding, details of layers and gratings are not shown other than an input grating 207. More detailed embodiments are presented below, for example in FIGS. 7A and 7B. The waveguide directs image data in the form of image light from an image generation unit 120 towards the user eye space 140 while also allowing light from the real world to pass through towards the user's eye space, thereby allowing the user to have an actual direct view of the space in front of NED device 2 in addition to seeing an image of a virtual feature from the image generation unit 120.

In the illustrated embodiment, the image generation unit 120 in a left side housing 1301 includes one or more LEDs, a microdisplay which produces the image light and waveguide coupling optics 227 for coupling the image light into the waveguide 123 at one or more input gratings represented by input grating 207.

There are different image generation technologies that can be used to implement an image source. For example, a microdisplay can be implemented using a transmissive projection technology. In one example of such technology, a transmissive microdisplay modulates optically active material and is backlit with white light. These technologies are usually implemented using LCD type displays with powerful backlights and high optical energy densities. Other microdisplays use a reflective technology for which light from an illumination unit is reflected and modulated by an optically active material or mechanical micromirror structures. The illumination maybe a white source or RGB source, depending on the technology. The optically active material may be liquid crystals (LC), commonly known as LC on silicon (LCOS). Mechanical micromirror structures may include arrays of micromirrors such as Digital light processing (DLP), digital micromirror device (DMD), and Mirasol® display technology from Qualcomm, Inc. All are examples of reflective technologies which reflect energy back from the modulated structure and may be used in forming the visible image. Additionally, a microdisplay can be implemented using an emissive technology where light is generated by the display. An example of an emissive technology is organic light emitting diode (OLED) technology. Examples of self-luminous OLED microdisplays are made by companies such as eMagin and MicroOLED. The technology will also work with microdisplays in which inorganic LEDs form an image as well.

FIG. 3B shows half of the head mounted display device 2. For the illustrated embodiment, a full head mounted display device 2 may include another display optical system 14 with another set of optional see-through lenses 116 and 118, another waveguide 123, as well as another image generation unit 120, and another of outward facing capture devices 113. In some embodiments, there may be a continuous display viewed by both eyes, rather than a display optical system for each eye. In some embodiments, a single image generation unit 120 may be optically coupled to a continuous display viewed by both eyes or be optically coupled to separate displays for the eyes. Additional details of a head mounted personal A/V apparatus are illustrated in U.S. patent application Ser. No. 12/905,952 entitled Fusing Virtual Content Into Real Content, Filed Oct. 15, 2010, fully incorporated herein by reference.

FIGS. 4A, 4B, 4C and 4D are block diagrams for illustrating some embodiments of different arrangements in terms of light flow path from LEDs through corresponding filters and display element devices (latter not present in FIG. 4D) in an image generation unit which may be used in implementing the technology. In each of the embodiments, the control circuitry 136 provides control and power signals to the LEDs in the illumination unit 222 and to the respective display elements 224*a*, 224*b*, 224*c* and 224*d* (generically referenced here as display elements 224) and may also receive feedback signals such as from temperature sensors (not shown) or other monitoring sensors or circuits. The respective outputs 120*oa*, 120*ob*, 120*oc* and 120*od* of corresponding image generation units 120*a*, 120*b*, 120*c* and 120*d* (generically referenced here as units 120) are optically coupled via respective waveguide coupling optics 227 to corresponding multi-layer waveguides 123 as respective optical inputs 123*ia*, 123*ib*, 123*ic* and 123*id*.

In FIG. 4A, an illumination unit 222*a* comprises one or more LEDs 220*a* and one or more filters 221*a*. In some examples, a single waveband associated with a color is filtered. For example, the one or more LEDs may include a red LED, a blue LED and a converted green LED, and the one or more filters 221*a* includes a band filter, e.g. a bandpass filter or a bandstop filter, for allowing a green waveband narrower than its full spectral bandwidth and closer to the blue waveband to be optically coupled by coupling optics 223*a* to a display element 224*a* (e.g. LCoS, DMD, etc). There may be a gap in bandwidth between the filtered wavebands, in the visible spectrum. A band stop filter is also sometimes referred to as a band reject or a notch filter. On the other hand, a notch filter can also refer to a narrow band pass filter in optics. A band stop filter, for example, may have low transmittance in the green spectrum above about 540 nm or 25 nm above 515 nm. A band pass filter passes light unattenuated in a passband, e.g. pass unattenuated green light within a passband of about 50 nm centered around 515 nm in the green example.

Alternatively, instead of the converted green LED, a white LED may be used for providing the three colors of red, green and blue, and filtered for the desired wavebands. In other examples, the one or more filters 221a of FIG. 4A may be implemented as a blue waveband filter which receives the white light and allows a blue waveband narrower than the full spectral bandwidth for blue which is in the higher blue wavelength region closer to the green wavelength spectrum. In some embodiments, green light from a converted green LED or a white LED is filtered to allow a lower green waveband to be optically coupled to the display element 224a (e.g., one having liquid crystal pixel elements such as depicted for example in FIG. 6A), blue light from a blue LED or a white LED is also filtered to allow an upper blue waveband closer to the lower green waveband to be optically coupled to the display element 224a. Red light from a red LED or a white LED may also be filtered by a bandpass or bandstop filter before being optically coupled to the display element 224a.

The band filters may in some examples be implemented using absorbing pigment or dichroic filters. In some examples, such as those discussed in more detail below with respect to a color filter LCoS display element, absorbing pigment or dichroic mirrors may be used in combination with quantum dots for filtering and shifting light wavelengths to predetermined color wavebands. In other examples, a quantum dot converter with quantum dots responsive to the blue light and designed to emit longer wavelength light may be used as a filter, for example with a blue LED (in unit 220a), for generating light in the predetermined color wavebands for optical coupling to the multilayer waveguide 123. Often quantum dots convert ultraviolet or blue light to green or red, but they will convert any lower (or approximately same) wavelength light to their produced size determined wavelength. For example, red quantum dots will convert ultra-violet, blue or green to red.

FIG. 4B is a block diagram illustrating an arrangement in which the band filters 221b receive image light, which is light representing the at least partially formed (e.g., pixelated) image, from the corresponding display element 224b. FIG. 4C is a block diagram illustrating an arrangement in which the light emitted by the one or more LEDs 220c in the corresponding illumination unit 222c is optically coupled via coupling optics 223c to a color filter display element 224c which includes one or more filters for generating a first waveband for a first color narrower than the full spectral bandwidth for the first color and closer to a second waveband for a second color which may be an adjacent color on the spectrum. The second waveband may also be narrowed as discussed in the examples above. Some more detailed examples of such a color filter display element 224c are discussed further below, in some cases using quantum dots.

FIG. 4D is a block diagram illustrating a direct LED microdisplay as an image generation unit in which filtered light 120od generated by LEDs 220d and one or more filters 221d of the corresponding illumination unit 222d are optically coupled via waveguide coupling optics 227 to the multi-layer waveguide 123. (The image generation unit 120d may also include additional coupling optics.)

Figure 5C:
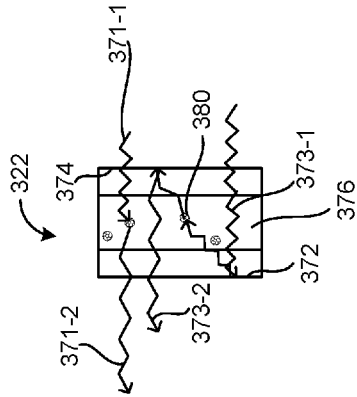
FIG. 5C illustrates another example of a color band filter using quantum dots which may be used to implement one or more filters in embodiments of the technology.
Figure 5A:
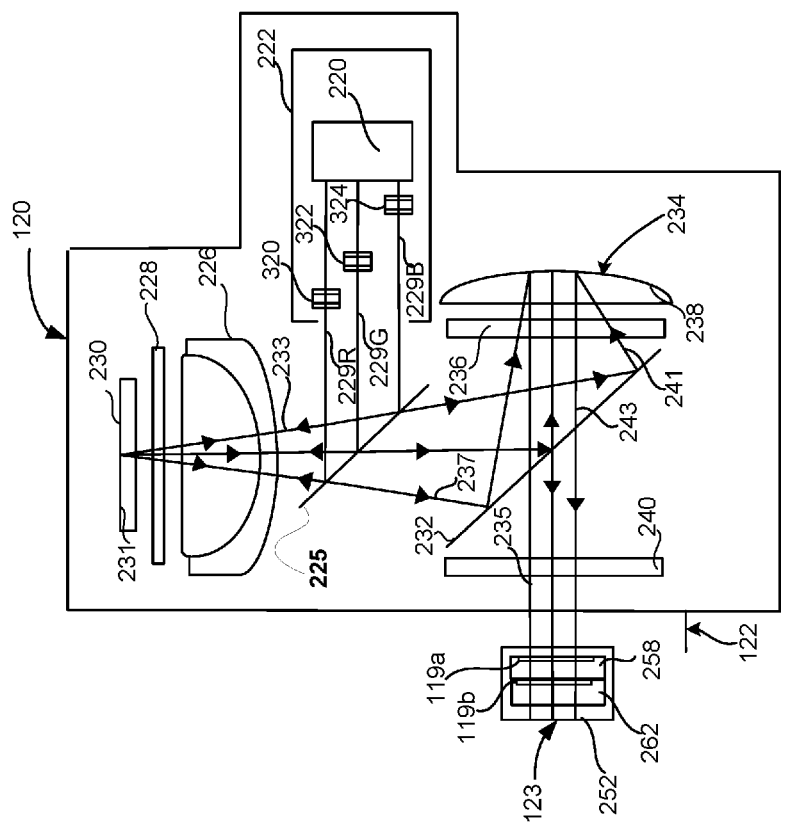
FIG. 5A is a block diagram of an embodiment of an image generation unit 120 as a projection light engine for generating image light for efficient coupling of two color wavebands into a same layer of a multi-layer waveguide 123.

FIG. 5A is a block diagram of an embodiment of an image generation unit 120 as a projection light engine for generating image light for efficient coupling of two color wavebands into a same layer of a multi-layer waveguide 123. In one aspect, FIG. 5A is a more detailed example of the embodiment in FIG. 4A. In this embodiment, the projection light engine 120 includes an illumination unit 222 with color filters 320, 322, and 324, an image forming portion embodied as a reflective color sequential liquid crystal on silicon (LCoS) microdisplay 230 having an LCoS surface 231 which reflects light sourced from the illumination unit 222 for representing the image data to be displayed, and a number of optical elements for coupling the illumination to the LCoS and the resulting image light to the waveguide 123.

In discussing the optical path of light through elements of the image generation unit 120 of FIG. 5A, different portions of the illumination light and image light are labeled with different numbers to facilitate discussing the progress of the light. To avoid overcrowding the drawing, only one representation ray of the beam is labeled at each stage of the path.

In one embodiment, a color sequential LED device 220 is used including red, green and blue LEDs which are turned on in a sequential manner in timing with the LCoS for making a full color image. Individual display spots (pixels) on the LCoS surface 231 are controlled by the microdisplay circuitry 259 to alter the polarization state of the red, green and blue light to form the color indicated by the display driver 246 for the image data. The illumination unit 222 includes at least one band filter 322, shown here as being for filtering green light 229G, for example from a converted green LED of the LED device 220. Filters 320 and 324 may also be present for red and blue light. Some implementation examples for filters are illustrated in FIGS. 5B and 5C. Red, green and blue light 229 generated by the illumination unit 222 in sequence is directed to the polarizing illumination beam splitter 225 which directs the light 233 in the direction of the LCoS surface 231. In other embodiments, the LCoS may be a color filter LCoS so that the LED device 220 directs white light or red, green and blue light at the same time through the filters 322, 324, 320 for optical coupling with the LCoS panel 230 which includes filters, as discussed in examples 6A through 6C below. The filtered LED light is directed by a polarizing illumination beam splitter 225 towards in this example, a reflective surface 231, of the LCoS display device 230, sometimes referred to as a panel.

In this example, the LCoS display device 230 has an accompanying polarization analyzer optical element 228 whose compensation parameters were determined during manufacture to absorb light with one polarization state, enabling image tonescale formation after the LCoS. Doublet 226 corrects for chromatic aberration. The image light 237 polarized and reflected from the LCoS surface 231 and analyzer 228 is collimated or increased in optical power by the doublet 226 due to its curved surfaces. The image light 237 passes through the illumination beam splitter 225 before being optically coupled by an arrangement of optical elements including a birdbath mirror into a waveguide 123.

After passing through the illumination beam splitter 225, the image light 237 intercepts polarizing beam splitter 232 which directs the again polarized reflected light 241 through a quarter waveplate 236, which again passively alters the polarization state of the reflected light, to the curved reflective surface 238 of a birdbath optical element 234 which collimates and reflects the image light back through the quarter waveplate 236 for another polarization state alteration. The quarter waveplate provides circular polarization while the polarizing beam splitters 225, 232 generally act as linear polarizers. The birdbath reflected, and twice quarter turned, image light 243 passes through beam splitter 232 and the polarization state is altered yet again by red rotation plate 240. The red rotation waveplate rotates the polarization state of red wavelengths through ninety (90) degrees. The image light 235 then exits the image generation unit 120, also referred to here as a projection light engine 120, for optical coupling into waveguide 123. In other embodiments, like embodiments using a transmissive or emissive image source including its own illumination unit 222, besides omitting the doublet, the illumination beam splitter 225 may also be omitted.

The waveguide 123 extends into the page and into the near-eye display 14 approximately parallel to the eye area 140 and extends a much smaller amount out of the page. In this embodiment, the waveguide 123 is multi-layered with two exemplary layers, 258 and 262, in this example surrounded by an outer protective covering 252 of see-through glass through which the image light 235 passes. Line 122 indicates a distance between the projection light engine 120 and the waveguide 123. The image is not drawn to scale, but an example of such a distance between the light engine and the waveguide is about 0.5 mm. In this example, optical input grating 119a closest to the projection light engine is a target location for an exit pupil to be projected or a target location at which light from an exit pupil internal to the projection light engine is refocused for coupling to a waveguide. In this example, again not drawn to scale, the exit pupil or refocused exit pupil is projected about 5 mm from the outside of the projection light engine 120 to the optical input grating 119a of the waveguide.

Figure 7B:
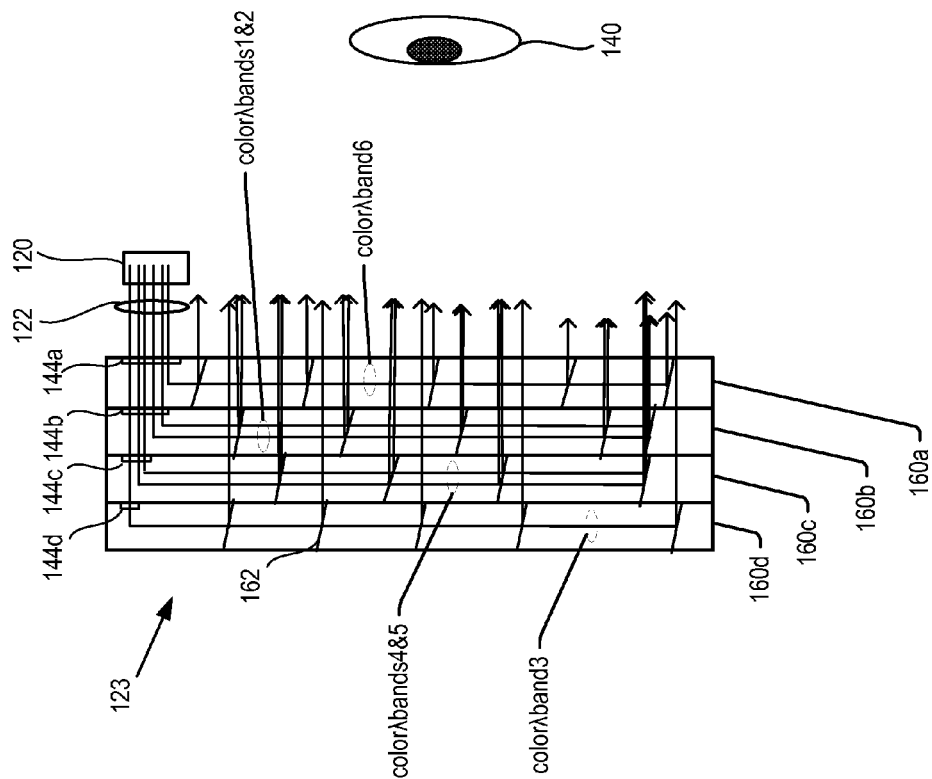
FIGS. 7A and 7B are block diagrams illustrating embodiments of a multi-layer waveguide having at least one of the layers having an input grating having a wavelength band extensive with a waveband including the first narrowed color waveband and a second color waveband.
Figure 7A:
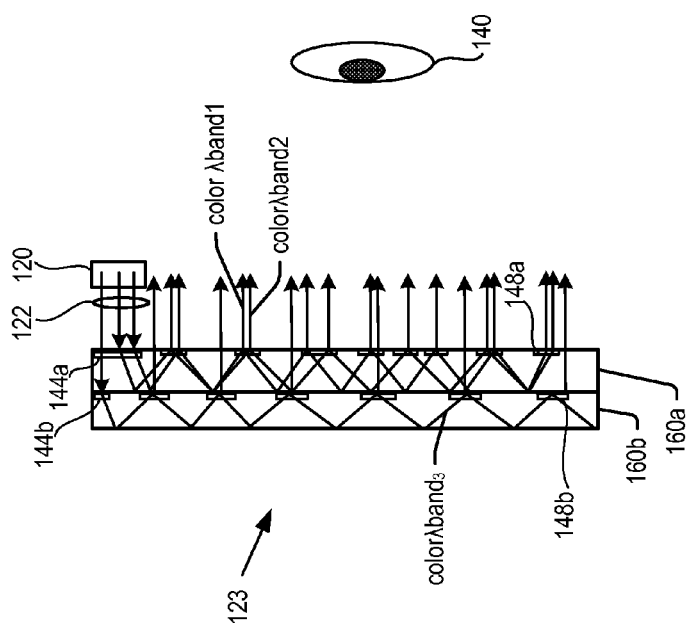

The waveguide 123 is positioned within housing 130 for optical coupling of the image light. Each of the layers is shown having its own input grating. An example of an input grating is a surface relief grating manufactured as part of the surface of each layer in the waveguide 123. Layer 258 first receives the image light 235 which has exited the projection light engine and couples that light through its optical input grating 119a. Similarly, layer 262 couples the image light 235 through its optical input grating 119b. FIGS. 7A and 7B discuss waveguide gratings and their matching with color wavebands in more detail below.

Figure 5D:
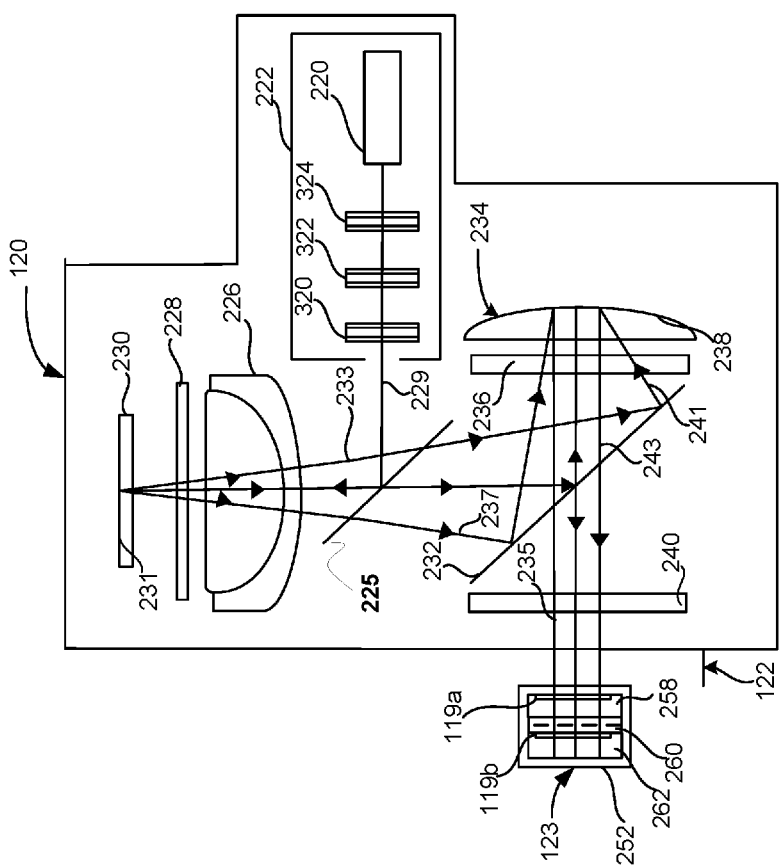
FIG. 5D illustrates another version of the image generation unit in which a white LED may be used as an illumination source followed by one or more band filters.

Continuing with the discussion of embodiments of image generation units providing filtered color image light for more efficient coupling with a waveguide, FIG. 5D illustrates another version of the image generation unit 120 of FIG. 5A in which a white LED may be used as an illumination source followed by one or more band filters 320, 322 and 324 in series for generating at least a first color waveband for a first color narrower than the full spectral bandwidth for the first color. Also, in this example, a center waveplate 260 is located between wavelength layers 258 and 262 and is a target location for an external exit pupil or a refocus point when the exit pupil is inside the projection light engine. The center waveplate 260 may couple and change the polarization state of the image light 235 it has received.

FIG. 5B illustrates an example of a color band filter which may be used to implement one or more filters in embodiments of the technology. Exemplary filter 322 comprises a collimating optical element 354 and a dichroic filter 352. A layer 356 between the filters may be air or high index glass, e.g. refractive index greater than 1.5. In this example, light of different wavelengths represented by rays 351, 353 and 355 generated by an LED such as a converted green LED enters the filter by passing through and being collimated by optical element 354 and meets a partially reflective surface of filter 352. The partially reflective surface may be a partial mirror coated to reflect light of a certain wavelength band (waveband), for example green light with wavelengths between 540 nm to about 575 nm. Light ray 356 is representative of light of wavelengths outside this waveband so light ray 356 passes through the partial mirror 352 for optical coupling to a display element or waveguide. Light rays 351 and 353 have wavelengths in this upper portion of the green spectral bandwidth and so are reflected by the dichroic filter 352 towards collimating optical elements 354. After being collimated again, rays 351 and 353 travel back toward the LED device 220.

FIG. 5C illustrates another example of a color band filter using quantum dots which may be used to implement one or more filters in embodiments of the technology. Before discussing the particulars of the example of FIG. 5C, some background on quantum dots is provided.

In contrast to liquid crystals (used in LCDs and LCoS display elements), quantum dots may emit light. In general, a quantum dot comprises a portion of matter (e.g., a semiconductor) whose excitons are confined in all three spatial dimensions. Consequently, quantum dots have electronic and optical properties between those of bulk semiconductors and discrete molecules. Quantum dots may be made of a binary alloy such as cadmium selenide, cadmium sulfide, indium arsenide, or indium phosphide. Quantum dots may also be made of a ternary alloy such as cadmium selenide sulfide. Some quantum dots may contain as few as 100 atoms within the quantum dot volume, with a corresponding diameter of roughly between 2 and 10 nanometers.

Quantum dots have a photoluminescent property to absorb light of a first wavelength (absorption spectrum) and to emit light of a second wavelength (emission spectrum) longer than the first wavelength. Quantum dots may be excited with light that has a wavelength that is shorter than their fluorescence wavelength. The color characteristics of the light emitted from a quantum dot depends on the chemical composition of the quantum dot, as well as the size and shape of the quantum dot. These properties of quantum dots, as emitters of light, confer the advantage that the light emission wavelength may be precisely tuned by varying the size of the quantum dot particle. Unlike organic dye molecules, which may have similar optical properties, quantum dots are very stable and tend not to degrade from prolonged exposure to short-wave light.

The physical reason that quantum dots of the same material, but of different sizes, can emit light of different colors is due to the quantum confinement effect. Due to the quantum confinement effect, the bandgap energy associated with a quantum dot becomes size dependent. Generally, the smaller the size of the quantum dot, the greater the difference in energy between the highest valence band and the lowest conduction band (i.e., the larger the bandgap). With a quantum dot, the bandgap energy that determines the energy of the fluorescent light (and hence the light of the color emitted) is inversely proportional to the size of the quantum dot. Therefore, the larger the quantum dot, the redder or lower energy the light emitted. Conversely, the smaller the quantum dot, the bluer or higher energy the light emitted.

In this example of FIG. 5C, filter 322 comprises a partially reflective color selective surface 372 such as a partially reflective dichroic mirror facing a reflective surface 374, and a quantum dot layer 376 in between the reflective surfaces. Surface 372 permits light of a particular color waveband to pass through while reflecting other wavelengths. For example, a coating may have been applied to surface 372 to create the pass band or surface perturbations may have been made in the surface to create the passband. Light outside the passband is reflected back into the quantum dot layer for another pass at conversion. Reflective surface 374 in this example is fully reflective so as to recycle light which is not converted back into the quantum dot layer 376 for another chance at conversion, and reflecting converted light back towards surface 372 transmission out of the filter 322. The incoming LED light may be for example blue light which has a shorter wavelength than green and red. As illustrated in this example, the incoming LED has a shorter wavelength and the quantum dots change the wavelength to a longer wavelength and thus a different hue of a color or a separate color like green in a desired passband like the example 50 nm centered about 515 nm which can be adjacent a blue color waveband extending to 490 nm.

In between the reflective surfaces in the quantum dot layer 376 is a transparent material including one or more quantum dots 380. (Only one is labeled to avoid overcrowding the drawing.) In this example, layer 376 is a solid transparent, non-conducting material, like a plastic insulator, and the quantum dots 380 encased therein are excited by incoming LED light represented by rays 371-1 and 373-1. In other examples, the quantum dots may be in a liquid non-conducting material, like an organic solvent. As discussed in the example of FIG. 6B, a separate excitation layer may also be incorporated into the filter.

In this example, incoming ray 371-1 collides with a quantum dot and is converted to a longer wavelength as indicated by outgoing ray 371-2. Incoming ray 373-1 does not collide with a quantum dot on a first pass through the filter, and is reflected by partially reflective dichroic mirror 372 back into quantum dot layer 376 where it collides with a quantum dot 380. The resulting longer wavelength converted ray 373-2 is reflected off reflective surface 374 and exits the filter through partially reflective surface 372 as its longer wavelength is in the pass band.

FIGS. 6A, 6B, 6C and 6D illustrate examples of color filter LCoS displays, also referred to as panels, which incorporate filters for generating a reduced bandwidth of at least a first color. A color filter LCoS display has spatially separated color filters so white LED light can be used, blue LED light in a quantum dot scenario can be used, or red, green and blue LED light for representing an image can be displayed at the same time. Each of FIGS. 6A, 6B, 6C and 6D represent a pixel of a LCoS color filter display.

Figure 6A:
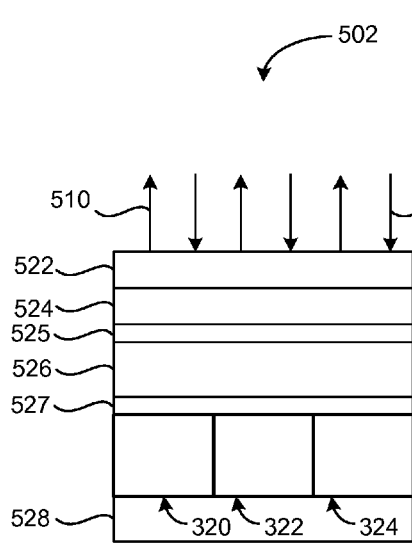
FIGS. 6A, 6B, 6C and 6D illustrate examples of color filter LCoS display elements, also referred to as panels, which incorporate filters for generating a reduced bandwidth of at least a first color.

The LCoS pixel 502 example of FIG. 6A includes a substrate and electrode drive circuitry layer 528, for example a silicon substrate, on top of which are a layer of color filters 320, 322 and 324, followed by an alignment layer 527, topped by a liquid crystal layer 526, on top of which is another alignment layer 525, a transparent electrode 524, for example controlled by the display circuitry 246 for controlling what the liquid crystals display, and a transparent protective substrate layer 522. Other layers, such as intervening protective layers, may also be included as known to those of ordinary skill in the art. Just one incoming ray 512 and one outgoing ray 510 are labeled to avoid overcrowding the drawing. Incoming rays 512 represent LED light coming towards the LCoS, and outgoing rays 510 represent image data generated by operation of the LCoS pixel.

In the example, the color filters are for red 320, green 322 and blue 324. The incoming LED light in this example may be white light or red, green and blue LED light coming in simultaneously. A color filter LCoS can also be operated in a color sequential manner in which the appropriate color filter is activated in coordination with a corresponding color LED. In this embodiment, each filter 320, 322, 324 is a respective color absorptive pigment filter. At least one of the pigment filters may be designed to pass through to the liquid crystal layer 526 a narrower color waveband adjacent to or closer to a waveband produced for another color. In this example, each color's waveband is narrowed. The light not within the narrower color waveband is absorbed by the substrate 528.

Figure 6C:
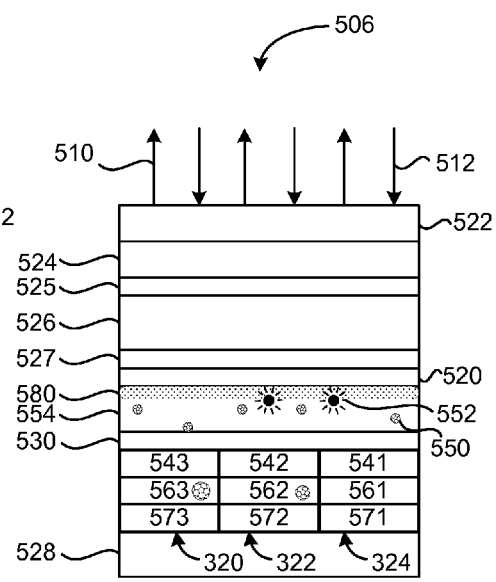
Figure 6B:
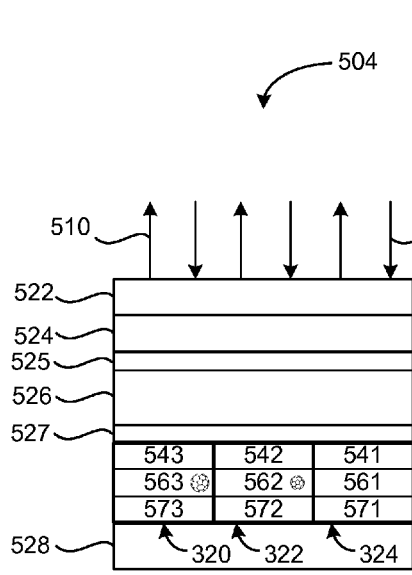

The LCoS pixel 504 example in FIG. 6B is another version of the pixel in FIG. 6A except the red filter 320, and the green filter 322 include quantum dots. In this example, the blue filter 324 may be an absorbing pigment filter. Each of 573, 572, and 571 may be a color selective filter like a dichroic mirror which operates like reflective surface 374 in FIG. 5C by reflecting light it receives back into a respective quantum dot layer 563 and 562. Layer 561 for blue may be of pass through material. As illustrated, by the representative quantum dots, a quantum dot for converting blue light to red light is bigger than the quantum dot for converting blue light to green light. Partially reflective elements 543, 542 and 541 pass through light of the converted wavelength band and reflect unconverted light back into the respective quantum dot layer 563 and 562 or back to the pigment, 561 for blue. In this way, light is recycled for another chance at conversion.

FIG. 6C illustrates another version of the LCoS pixel of FIG. 6B including an additional excitation layer 520 for quantum dots. The excitation layer 520 stimulated by the incoming LED light 510 may produce one or more evanescent fields 580 via total internal reflection within excitation layer 520. Quantum dots 550 are suspended in a clear or transparent fluid 554. Quantum dots may become charged quantum dots 552 due to the evanescent field 580 and may emit light associated with a particular wavelength. A cover plate 530 may be arranged in a parallel plate configuration with the excitation layer 520. The charged quantum dots pass through partially reflective mirrors 543 and 542.

The color strips for red and green 563 and 561 may include quantum dots within a solid transparent material (e.g., transparent plastic with moisture barrier layers). The quantum dots within color strips 563 and 561 may be excited by light emitted from charged quantum dots 552. For example, light of a first frequency emitted by charged quantum dots 552 (e.g., blue light) may cause quantum dots within a particular color strip to emit light of a second frequency (e.g., red light). In one embodiment, color strip 563 includes quantum dots capable of emitting light associated with the color red, color strip 562 includes quantum dots capable of emitting light associated with the color green, and color strip 561 does not include quantum dots and is completely transparent.

Figure 6D:
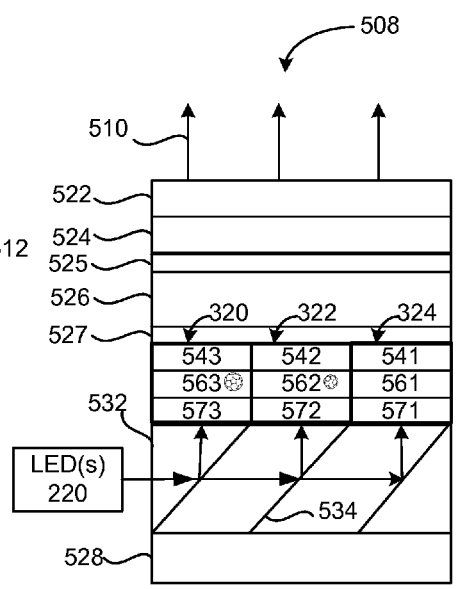

FIG. 6D illustrates another version of the LCoS pixel of FIG. 6B except that illumination from one or more LEDs 220 is coupled, for example via reflecting element 534, received via the color selective filters 573, 572 and 571.

The color filtering performed to narrow one or more color wavebands to a portion of its spectrum closer to a color waveband of an adjacent color allows for more efficient coupling into a waveguide layer via an input grating like a diffractive grating. An example of a waveguide which may be used is a surface relief grating. FIGS. 7A and 7B are block diagrams illustrating embodiments of a multi-layer waveguide having at least one of the layers having an input grating having a wavelength band extensive with a waveband including a first waveband for a first color and a second waveband for a second color. In other words, the wavelength band of the grating extends from and includes the first waveband, the second waveband and any wavelengths between them. The first waveband (e.g. 490 nm to 540 nm for green) is a narrower portion of its full spectral color bandwidth (e.g. for green 495 nm-570 nm) and this narrower portion is designed to be closer to the second waveband of the adjacent second color (e.g. blue).

Polarizing reflectors in the light conversion cavities can also be used to avoid LCoS losses. Furthermore, due to the very small space available on the LCoS device, other embodiments may user multiple LCoS devices to allow each color or two colors to be generated independently.

FIG. 7A is a block diagram of an embodiment of a two layer waveguide 123. Wavebands in the red, green and blue portions of the visible light spectrum are image light representing an image and are optically coupled from image generation unit 120 through a representative coupling optic 122, illustrated here as a collimating lens. Color wavelength ($\lambda$) band1 from image generation unit 120 includes in this example a blue color waveband of about 35 nm-50 nm centered about 450 nm. Color $\lambda$ band2 is a green color waveband of about 35 nm-50 nm centered about 515 nm. Color $\lambda$ band3 is a red color waveband centered about 617 nm. The red color $\lambda$ band3 in some examples may also extend 35 nm-50 nm and in other examples may extend up to 100 nm.

In this example, each diffractive input grating 144a, 144b couples light in a waveband matching its band into its respective waveguide layer 160a, 160b for total internal reflection, and passes through light which does not have a wavelength falling within its band. For layer 160a, input grating 114a couples in the blue and green color wavebands color $\lambda$ band1 and color $\lambda$ band2 which have each been narrowed in their portions of the visible spectrum by filtering performed by the image generation unit 120. The red wavelengths pass through grating 144a and are coupled by grating 144b into waveguide layer 160b for total internal reflection.

Output gratings 148a and 148b are used in this example. The output gratings 148a have a wavelength band matching a waveband including both the blue and green color wavebands, and diffract out these wavebands from layer 160a. Output gratings 148b diffract out red color $\lambda$ band3. The output diffractive gratings are designed in this example to progressively output more of the input red light as it travels down the waveguide so all the light is uniformly directed to eye area 140 for all angles.

Light is coupled into a waveguide layer by an input diffraction grating at an incident angle $\Theta_1$. The input diffraction grating, e.g. 144a or 144b, redirects the waveband through an angle of diffraction $\Theta_2$. The refractive index $n_2$, angle of incidence $\Theta_1$, and angle of diffraction $\Theta_2$ are predetermined so that the waveband undergoes total internal reflection within the waveguide layer, e.g. 160a or 160b.

Waveguides may be optimized, or matched, to a particular wavelength band as noted above. This relationship may be determined according to the grating equation:

$$m\lambda = p(n_1 \sin\Theta_1 + n_2 \sin\Theta_2), \quad (1)$$

where:
m=diffraction order;
$\lambda$=the wavelength band matched to the waveguide/diffraction gratings;
p=grating period;
$n_1$=refractive index of incident medium;
$n_2$=refractive index of waveguide 140;

$\Theta_1$=incident angle;
$\Theta_2$=diffraction angle.

By varying parameters such as the grating period p and the refractive index $n_2$, a particular waveguide layer may be matched to a particular wavelength band. In other words, a particular waveband may couple into a matched waveguide layer 160a, 160b with a higher coupling efficiency than other wavelength bands. An example of a grating which may be used is a surface relief grating. Diffraction gratings may be transmissive gratings or reflective gratings.

FIG. 7B is a block diagram of an embodiment of a four layer waveguide 123 with four input gratings 144a, 144b, 144c and 144d. In this example, more waveguide layers, 160a, 160b, 160c, 160d may be used as a tradeoff for more narrowed color wavebands. Instead of output gratings, partially reflective elements 162 are used to reflect the image light towards the eye area 140. For example, dichroic mirrors could be used which reflect more and more light out of the waveguide as the light travels down the waveguide. Color $\lambda$ band6, may for example cover about 50 nm of indigo and violet. Color $\lambda$ bands 1&2 and color $\lambda$ band 3 are the same as in the example of FIG. 7A. Color $\lambda$ bands 4&5 may capture portions of the upper green spectrum for example, a green color waveband of about 50 nm centered around 550 nm and more of the lower yellow and orange spectrum for a waveband centered around 590 nm. The separation of the color bands into different waveguide layers enhances contrast.

FIG. 8A is a flowchart of an embodiment of a method for optimizing waveguide performance based on color filtering in a near-eye display (NED) system. In step 402, an image generation unit generates NED image light of at least three colors including a first waveband for a first color narrower than the full spectral bandwidth for the first color and closer to a second waveband for an adjacent second color. In step 404, the first waveband and the second waveband are optically coupled into an input grating for one layer of a plurality of layers of a waveguide of the NED. The input grating has a grating wavelength band approximately matching a waveband extensive with the first waveband and the second waveband for coupling light into the one layer.

FIG. 8B is a flowchart of another embodiment of a method for optimizing waveguide performance based on color filtering in a near-eye display (NED) system. Steps 412 and 414 may be used to implement step 402 in the embodiment of FIG. 8A. In step 412, one or more LEDs of an image generation unit of a near-eye display (NED) system emit light for at least three colors. In step 414, a spectral bandwidth emitted for at least one color is narrowed to a first waveband spectrally closer to a second waveband of a second adjacent color. In step 416, the first waveband and the second waveband are optically coupled into an input grating for one layer of a plurality of layers of a waveguide of the NED. As noted above, the input grating has a grating wavelength band approximately matching a waveband extensive with the first waveband and the second waveband for coupling light into the one layer.

FIG. 8C is a flowchart of yet another embodiment of a method for optimizing waveguide performance based on color filtering using one or more quantum dots for converting light to a desired waveband in a near-eye display (NED) system. In step 422, one or more LEDs of an image generation unit of a near-eye display (NED) system emit light, and in step 424, at least a portion of the emitted light is converted to a first waveband for a first color narrower than the full spectral bandwidth for the first color and closer to a second waveband for an adjacent second color. Steps 422 and 424 may be used to implement step 402 in the embodiment of FIG. 8A. In step 426, the first waveband and the second waveband are optically coupled into an input grating for one layer of a plurality of layers of a waveguide of the NED, the input grating having a grating wavelength band approximately matching a waveband extensive with the first waveband and the second waveband for coupling light into the one layer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

What is claimed is:

1. A display system comprising:
   a display including a waveguide configured to output colors viewable by one or more human eyes as a colored image; and
   an image generation unit optically coupled to the waveguide to provide the waveguide with image forming light rays that are then distributively reflected within and output by the waveguide, the image generation unit being configured to generate first light rays within a first waveband for a first color which first waveband is narrower than and used in place of a full spectral bandwidth perceivable by human eyes for the first color and to generate second light rays within a second waveband for a different second color perceivable by human eyes, the generated first and second being coupled through a shared optical input into the waveguide.

2. The display system of claim 1 wherein the display system is a near-eye display system comprising:
   a near-eye support structure; and wherein:
   the display is a near-eye display (NED) supported by the near-eye support structure,
   the waveguide has a plurality of layers;
   the image generation unit is supported by the near-eye support structure, the image generation unit includes one or more light emitting diodes (LEDs) for emitting light;
   the image generation unit is configured to output its image forming light rays using the light emitted by the one or more LEDs for the NED;
   the output image forming light rays include those within the first waveband for the first color, which first waveband is narrower than the full spectral bandwidth for the first color and those within the second waveband for the second color, the second color being adjacent to the first color in a visible spectrum; and
   the display system further comprises one or more color waveband selective optical elements, including a first input grating of one layer of the waveguide that defines at least part of said shared optical input, the first input grating optically being coupled for receiving image forming light rays from the image generation unit and having a grating wavelength band approximately matching a waveband extensive with the first waveband and the second waveband for coupling light into the one layer of the waveguide.

3. The near-eye display system of claim 2 wherein:
   the first color is green, and the second color is blue, and the first waveband includes a lower portion of the spectral waveband of green, and is approximately centered about 515 nanometers (nm) and has a spectral width of about 50 nm.

4. The near-eye display system of claim 3 wherein:
   the waveguide has only two layers;
   the second waveband is approximately centered about 450 nm; and
   the waveguide comprises a second input grating for coupling red image light approximately centered about 617 nm into a second layer of the two layers.

5. The near-eye display system of claim 2 wherein:
   the waveguide is a diffractive waveguide, and the first input grating of the one layer is a surface relief grating.

6. The near-eye display system of claim 2 wherein:
   the one or more LEDs include a converted green LED.

7. The near-eye display system of claim 2 wherein the image generation unit further comprises at least one band filter for generating the first waveband for the first color from the light emitted by the one or more LEDs for the NED.

8. The near-eye display system of claim 7 wherein the at least one band filter includes a dichroic mirror.

9. The near-eye display system of claim 7 wherein the at least one band filter uses one or more quantum dots for converting light emitted by a blue LED of the one or more LEDs for generating the first waveband for the first color.

10. The near-eye display system of claim 2 wherein
    the image generation unit includes a color filter liquid crystal on silicon (LCoS) display element having color filters; and
    at least one of the color filters includes quantum dots for converting light emitted by the one or more LEDs to the first waveband.

11. A near-eye display system comprising:
    a near-eye support structure;
    a near-eye display (NED) supported by the near-eye support structure, the near-eye display including a waveguide having a plurality of layers;
    the waveguide having a respective input grating for each respective one of the plurality of layers, and at least one of the layers having an input grating receptive to both of a first waveband for a first color, which first waveband is narrower than and used in place of a full spectral bandwidth perceivable by human eyes for the first color and to a second waveband for a different second color adjacent to the first color in a visible spectrum; and
    an image generation unit supported by the near-eye support structure and optically coupled to the waveguide to provide the waveguide with image forming light rays that are then distributively reflected within and output by the waveguide, the image generation unit being configured to generate first light rays within the first waveband for a first color in place of generating light rays in the full spectral bandwidth perceivable by human eyes for the first color and being configured to generate second light rays within the second waveband for the different second color perceivable by human eyes, the generated first and second light rays being coupled through a shared optical input into the waveguide.

12. The near-eye display system of claim 11 wherein:
    the image generation unit comprises one or more light emitting diodes (LEDs) including a converted green LED configured for emitting light having a waveband centered at 515 nm; and
    the image generation unit comprises a filter configured for passing the first waveband as one having a width of about 50 nm centered at 515 nm for optical coupling by the input grating having the wavelength band extensive with the waveband including the first waveband and the second waveband.

13. The near-eye display system of claim 11 wherein:
the image generation unit comprises a direct LED micro display including a converted green LED emitting a waveband including 515 nm; and
the image generation unit comprises a filter configured for passing the first waveband of about 50 nm centered about 515 nm for optical coupling by the input grating having the wavelength band extensive with the waveband including the first waveband and the second waveband.

14. The near-eye display system of claim 12 wherein the filter is a band stop filter.

15. The near-eye display system of claim 12 wherein the filter is a band pass filter.

16. A method of coupling optical imagery into an image displaying waveguide in a near-eye display (NED) system, the method comprising:
generating image light of at least three colors for coupling into the waveguide of the near-eye display (NED) by an image generation unit mounted on a near-eye support structure of the near-eye display system, the image light including a first waveband for a first color narrower than and used in place of a full spectral bandwidth for the first color and a second waveband for a second color of the three colors adjacent to the first color in a visible spectrum; and
optically coupling both of the first waveband and the second waveband from the image generation unit into an input grating of one layer of the waveguide such that the input image light is then distributively reflected within and output by the waveguide, the input grating having a grating wavelength band approximately matching a waveband extensive with the first waveband and the second waveband.

17. The method of claim 16 wherein the generating image light of at least three colors for the waveguide of the near-eye display (NED) comprises:
emitting light for the at least three colors by one or more LEDs of the image generation unit and narrowing the spectral bandwidth emitted for the first color to the first waveband which is spectrally closer to the second waveband for the adjacent second color than is another portion of the full spectral bandwidth for the first color.

18. The method of claim 16 wherein the generating image light of at least three colors for the waveguide of the near-eye display (NED) comprises:
emitting light by one or more LEDs of the image generation unit; and
converting at least a portion of the emitted light to the first waveband which is spectrally closer to the second waveband for the adjacent second color than is another portion of the full spectral bandwidth for the first color.

19. The method of claim 18 wherein the one or more LEDs is a blue LED.

20. The method of claim 16 wherein the second color is blue and the first color is green, and the first waveband of the first color is approximately 50 nm centered around 515 nm, and the second waveband of the second color is approximately 50 nm centered around 450 nm.

* * * * *